United States Patent [19]

Bossetti

[11] Patent Number: 4,582,464
[45] Date of Patent: Apr. 15, 1986

[54] BUFFER STORAGE UNIT FOR CERAMIC ARTICLES

[75] Inventor: Renato Bossetti, Novara, Italy

[73] Assignee: S.I.T.I. Societa Impianti Termoelettrici Industriali S.p.A., Marano Ticino, Italy

[21] Appl. No.: 583,637

[22] Filed: Feb. 27, 1984

[30] Foreign Application Priority Data

Mar. 11, 1983 [IT] Italy ............................... 20043 A/83

[51] Int. Cl.$^4$ ............................................ B65G 67/02
[52] U.S. Cl. .................................. 414/331; 414/392; 414/398; 414/399; 414/417
[58] Field of Search ............... 414/331, 390, 391, 392, 414/398, 399, 416, 417; 193/37; 198/782, 789

[56] References Cited

U.S. PATENT DOCUMENTS

| | | | |
|---|---|---|---|
| 1,565,984 | 12/1925 | Brockenbrough | 414/331 |
| 3,610,387 | 10/1971 | Stein | 193/37 |
| 3,904,053 | 9/1975 | Yatagai et al. | 414/417 |
| 4,094,425 | 6/1978 | Gabbrielli | 414/331 |
| 4,232,987 | 11/1980 | Giordano | 414/331 |
| 4,319,666 | 3/1982 | Hunter | 187/5 X |
| 4,474,525 | 10/1984 | Murao | 414/331 |

Primary Examiner—Robert J. Spar
Assistant Examiner—Ken Muncy
Attorney, Agent, or Firm—Wenderoth, Lind & Ponack

[57] ABSTRACT

A buffer storage unit for substantially plate-like ceramic articles includes at least one carriage movable along a feed-in path and adapted to contain a plurality of articles, and being formed by plural frames laid in vertical planes and attached to a carrier structure, each frame including a pair of vertical uprights to which are attached plural horizontal bar elements which define a plurality of planes for supporting the articles. A roller carrier is operative to insert rollers through vertical spaces left between the frames in a vertical direction. Engagement elements flank the carriage and is operative to hold the rollers in position during a loading/unloading step. The engagement elements are provided with elastic members at least at one of the roller ends.

4 Claims, 9 Drawing Figures

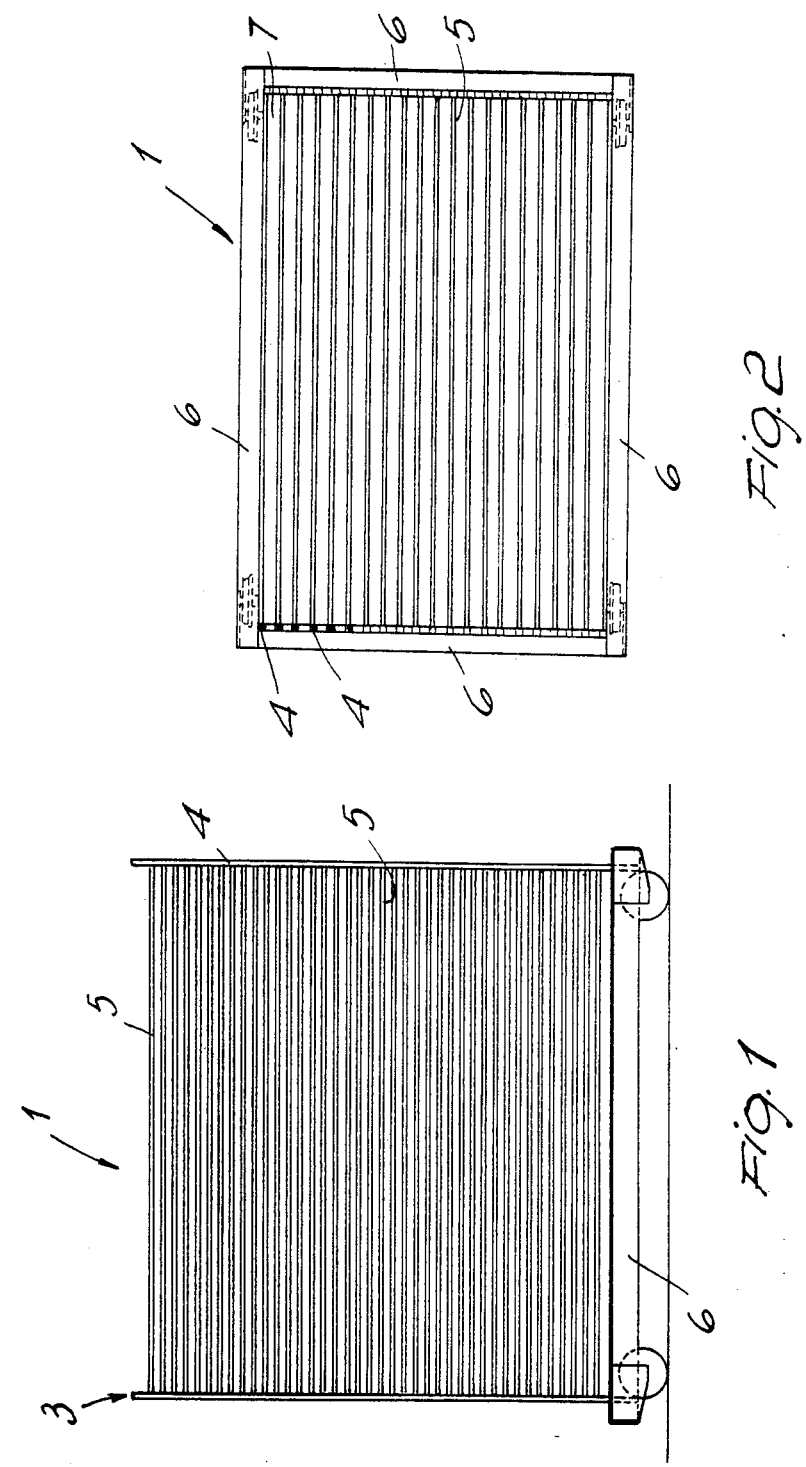

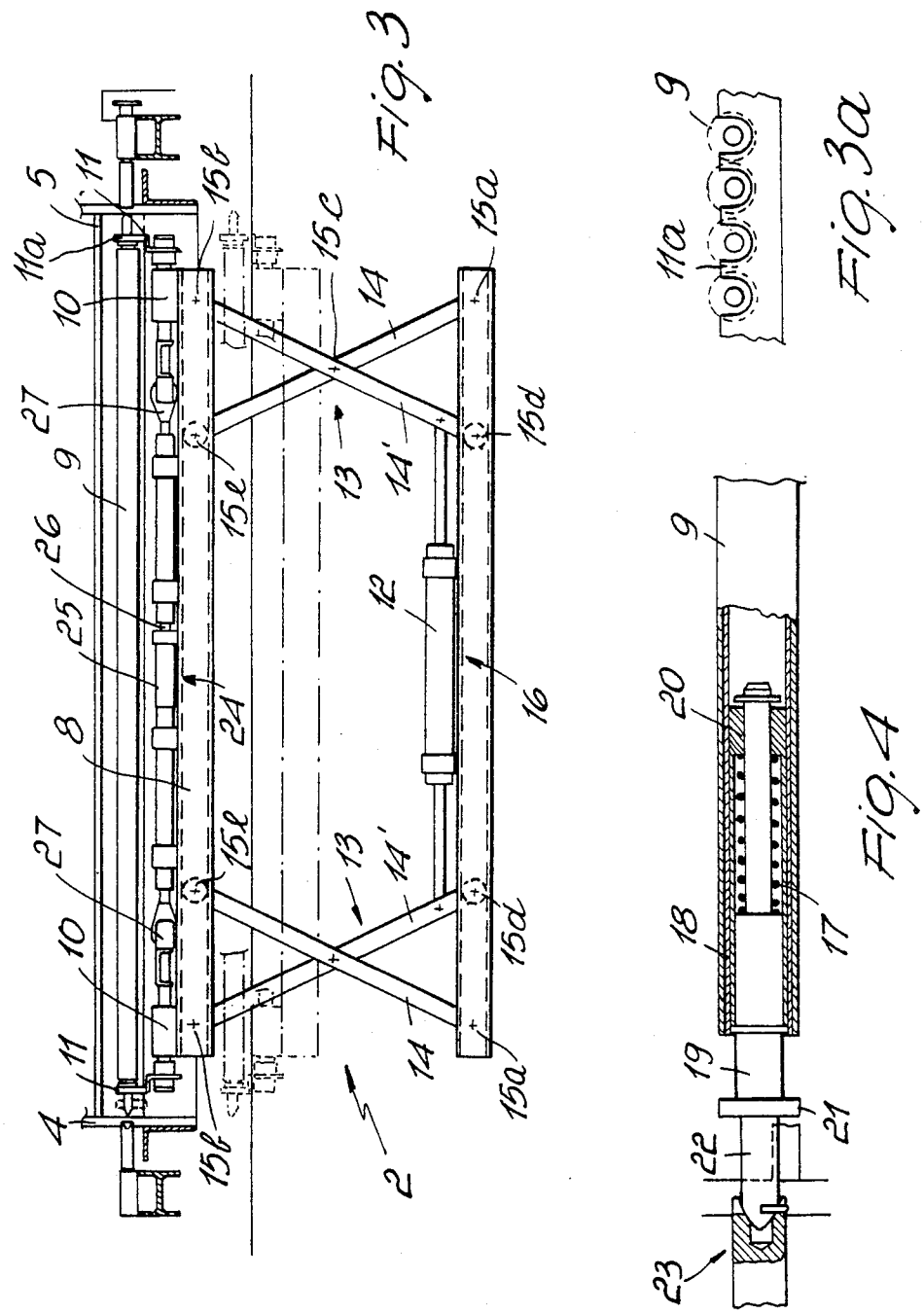

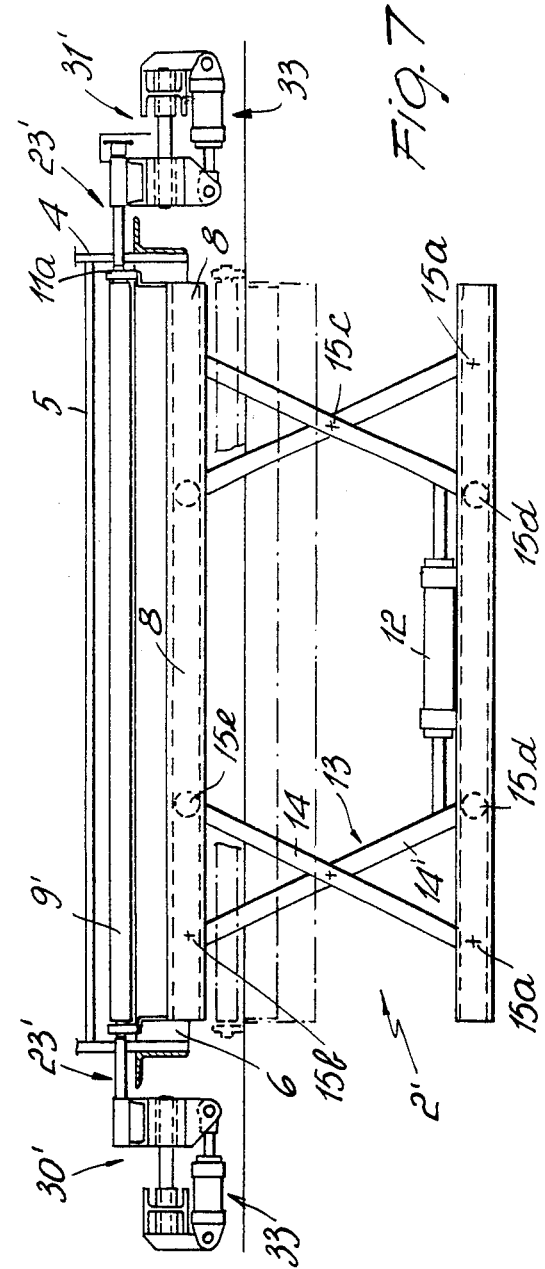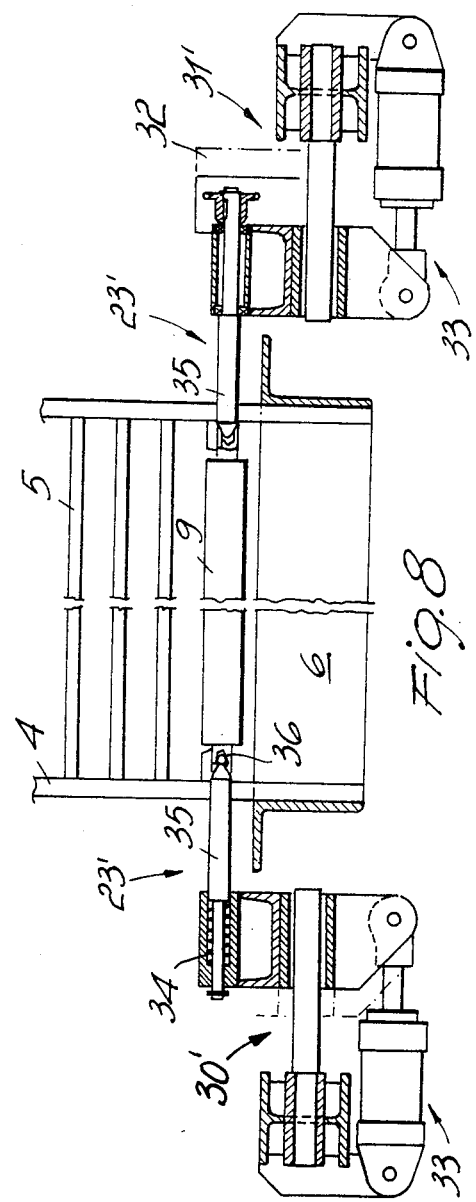

BUFFER STORAGE UNIT FOR CERAMIC ARTICLES

BACKGROUND OF THE INVENTION

1. Field of the Invention

This invention relates to a buffer storage unit for temporarily storing ceramic articles and blanks which have a substantially plate-like configuration.

More specifically, the invention is concerned with such a unit which comprises means arranged to receive and store quantities of ceramic articles for any selected period of time, even an extended one, and greatly simplified means of loading and unloading such articles.

2. Prior Art

A ceramic article buffer storage unit according to this invention is typically useful in glazed tile and the like manufacturing plants, where some apparata—typically baking funance(s)—are operated on a continuous basis for 24 hours a day and 7 days a week excepting for maintenance breaks, while other sections of the plant are only operated during work time hours, and in all cases on an intermittent basis. Such plant sections may be both upstream of a furnace, such as devices for forming and preparing blanks for baking, and downstream of it, such as means of checking and selecting articles, etc.

Accordingly, it is common practice to provide in such plants so-called "storage units", which comprise in practice means or containers wherein the articles and/or blanks can be stored and kept during the time periods when the intermittently operated equipment are inoperative. Since the storage units are required to accommodate and keep stored therein even quite large quantities of articles (in such circumstances as prolonged periods of inactivity, holidays, service stops, etc.), they usually take the form of plural containers which can be moved along a feed-in line, or so-called "carriages", and of a device for loading and unloading articles to/from the carriages.

Carriages generally include frames forming a plurality of stacked planes to/from which the articles (hereinafter called "tiles" for simplicity) can be placed and removed, the planes being defined by horizontally extending bar elements supported on pairs of vertical upright attached to the carriage bearing frame.

The tiles are loaded and unloaded by means of devices which include a plurality of carrier rollers adapted to be inserted through vertical openings of the carriage containment area and adapted to be moved in a vertical direction to load the tiles onto (and unload them from) the carriage supporting decks.

Known in the art are several types of tile buffer storage carriages. In particular, there are known carriages of the so-called "flutter" type having an open end and a load bearing frame of substantially "double C" configuration open at the front to receive the rollers. While such carriages, which are usually provided with stiffening arrangements and/or trim adjusting devices, are quite effective to perform their intended function, their construction is relatively complex and expensive.

Also known in the art is a tile holding carriage having a simpler construction bearing frame of the "fixed" end type, which comprises bar elements laid downwardly around the carriage. However, this prior carriage has the serious disadvantage of requiring the provision of rollers of its own which are permanently accommodated in vertical spaces on the carriage within which the rollers can be moved up and down to load and unload the tiles, the rollers being controlled through a translatable loading/unloading device relative to the carriage. This aggravates the complexity and costs involved in making such a storage unit.

SUMMARY OF THE INVENTION

It is a primary object of this invention to remove such prior shortcomings by providing a storage unit for ceramic articles, such as tiles, which requires no rollers of its own, provided for each carriage, while using a carriage construction of the fixed end type, which is quite simple and economical.

A further object of this invention is to provide a tile buffer storage unit which is highly reliable in operation, as well as very easily and quickly operated.

These and other objects such as will be apparent hereinafter are achieved by a buffer storage unit for substantially plate-like ceramic articles comprising at least one carriage movable along a feed-in line and being adapted to accommodate a plurality of articles therein, said carriage including a plurality of small frames laid in vertical planes and being attached to a carrier structure formed from sectional members arranged to surround the parallelepipedon defined by said small frames, each said small frame including a pair of vertical uprights to which are attached a plurality of horizontal bar elements to define plural horizontal supporting planes for said articles. The unit further comprises roller carrier means adapted to insert rollers through vertical spaces defined between said small frames and to displace said rollers in a vertical direction to effect the loading/unloading of tiles, and means of engagement with said rollers arranged to flank said carriages and being operative to hold said rollers in position during the loading/unloading steps, said rollers and/or said engagement means being provided with elastic means at least at one of said roller ends.

It may be appreciated that such a storage unit or arrangement will be, e.g. in a tile manufacturing plant, provided with a plurality of movable carriages, although a single roller carrier machine is quite adequate to load/unload the tiles onto/from the plural carriages.

In fact, once loaded, the roller carrier means will withdraw the rollers from the carriage, by disengaging them from the engagement means mentioned above, the thusly loaded carriage being then moved along the feed-in line toward successive processing stations and its place being occupied by another, empty, carriage ready to be filled.

BRIEF DESCRIPTION OF THE DRAWINGS

Some preferred embodiments of the invention will be now described in detail with reference to the accompanying drawings:

FIG. 1 is a side elevation view of a carriage of an article buffer storage unit of the invention;

FIG. 2 is a top plan view thereof;

FIG. 3 is a side elevation view of a roller carrier means of the buffer storage unit according to a preferred embodiment of the invention;

FIG. 3a is a detail view of a portion of FIG. 3;

FIG. 4 is a sectional view, on an enlarged scale, of a roller and roller engagement assembly according to the embodiment of FIG. 3;

FIG. 7 is a side elevation view of a second embodiment of the invention, and in particular of the roller carrier means of the storage unit; and FIG. 8 is a view similar to FIG. 5, but according to the embodiment of FIG. 7.

DETAILED DESCRIPTION OF THE INVENTION

Figure 5:
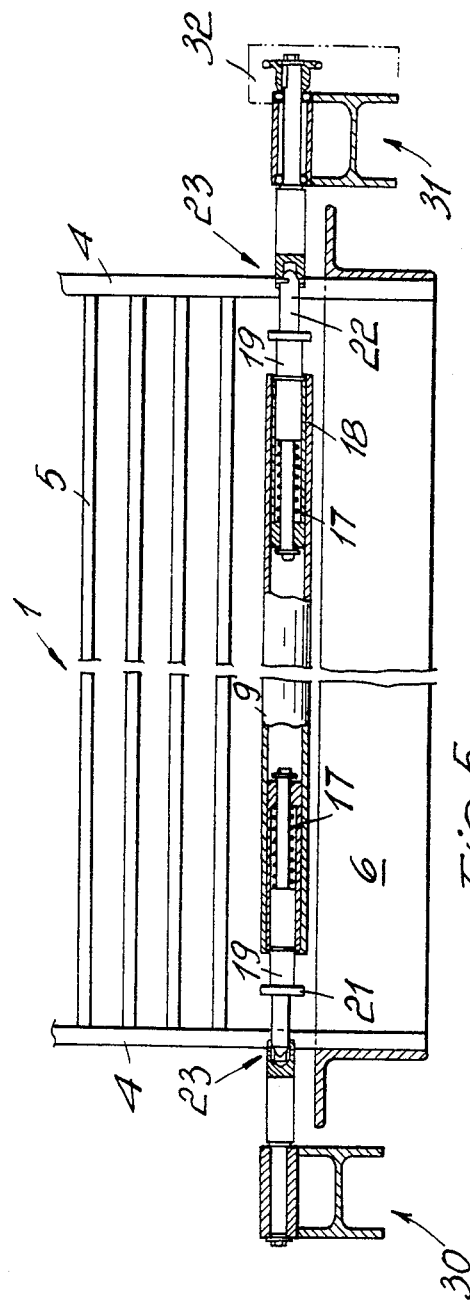
FIG. 5 is a partial sectional view of a roller shown in an inserted position according to the above embodiment of the invention.

With reference to the drawings, a tile buffer storage unit according to this invention comprises at least one carriage, generally indicated at 1, adapted to contain a plurality of articles, such as ceramic tiles, at least one loading/unloading device including a means of transporting tiles (not shown because of conventional design), and roller carrier means generally indicated at 2 and 2', respectively, in FIGS. 3 and 7.

The carriage, preferably but not necessarily employed with the unit according to this invention, is of the rigid end type, of simple and inexpensive construction. It comprises a plurality of small frames 3 extending in vertical planes and each formed by a pair of uprights 4 to which are attached, over the entire upright height, a plurality of bar elements 5 extending horizontally, parallel and at equal distances from one another, which define horizontal supporting planes for tiles to be loaded on the carriage.

A reinforcing and stiffening load bearing structure may comprise, for example, sectional members 6 arranged to extend externally around the parallelepipedon defined by the small frames 3 and other elements such as box-like angle sectional members at the edges and top portion, depending on individual requirements.

Thus, between the uprights 4 and respective horizontal bar elements or cross-wise supports 5, there are formed vertical openings 7 which extend over the full height of the main frame, these openings being sized and spaced apart so as to admit rollers therethrough and to permit vertical displacement of the rollers relative to the carriage for the tile loading or unloading steps.

The tile buffer storage unit of this invention further comprises roller carrier means operative to insert the rollers into the carriage 1 and move them in a vertical direction.

According to a preferred embodiment of the invention, shown in FIGS. 3 to 6, the roller carrier means or machine 2 includes a roller holder platform 8 capable of supporting a plurality of rollers 9 through guides 10 and roller locating racks 11. The roller carrier machine is equipped with two hydraulic systems. The first of these systems includes one or more hydraulic pistons 12 connected to structures 13 (in the drawing, two such structures 13 are shown) formed from sectional members 14 and 14' which are attached rigidly at 15a to the machine main frame 16 and at 15b to the platform 8, respectively. The members 14 and 14' are connected pivotally to each other at 15c, e.g. by means of a hinge. Also provided are movable couplings 15d and 15e between the members 14 and 14' and the frame 16 and platform 8. The couplings 15c, 15d and 15e enable the roller holder platform 8 to be displaced in a vertical direction by the hydraulic cylinder arrangement 12 up to the level of a desired deck (as indicated by dashed lines in FIG. 3).

According to the embodiment of FIG. 3, the rollers 9 which are to be inserted through the spaces 7 in the carriage would be provided, where required, with an elastic means such as springs 17 located at one or both ends of a roller on the interior thereof. Such elastic means enables the roller to be lengthened as it reaches a desired level, for introduction into an engagement assembly 23, and shortened to a sufficient extent for insertion through or removal from the spaces 7. In particular, the roller shown in FIG. 4 comprises two cylindrical elements 18 and 19 having different diameters, the element 19 of smaller diameter being slidable within the element 18 against the biasing force of one spring 17 accommodated in a spring holder element 20 interiorly of the roller. Also provided are a stop or hook 21 and a further pointed cylindrical element 22, both rigid with the element 19, the pointed tip of the element 22 being adapted for insertion into the engagement assembly, generally indicated at 23, to be described hereinafter. The roller may be fabricated from any suitable material, but would preferably comprise a metal material coated with a rubber or plastic layer for quiet operation.

In order to lengthen or shorten the roller, the roller carrier machine is equipped with a second hydraulic system 24 including a hydraulic piston 25 and rod 26. The piston 25 and rod 26 are connected, through couplings 27 provided to allow for a degree of backlash in the roller positioning operation, and through the guides 10, to the racks 11 which serve for positioning and centering the roller 9 as the tips 92 are inserted into the assembly 23. The racks 11 are rigid with the piston 25 and rod 26 and have a substantially rounded "V" (yoke-like) shape at 11a to define a seating for the roller 9. Of course, as many seatings will be provided as are the rollers to be inserted in the carriage.

Figure 6:
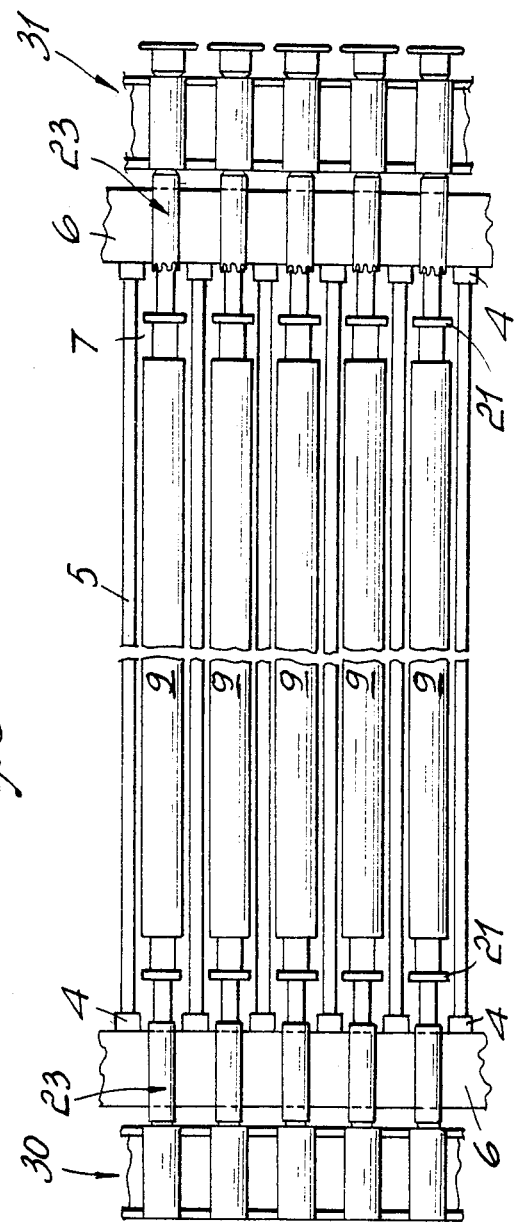
FIG. 6 is a fragmentary view from above of a supporting plane of the buffer storage unit, with the rollers inserted preparatory to tile loading or unloading operations.

FIG. 5 is a longitudinal sectional view taken through a vertical space 7 in the carriage, with a roller inserted through said space at the level of the first tile supporting deck, and FIG. 6 is a top plan view of a horizontal supporting plane with a plurality of rollers inserted for a tile loading and/or unloading operation.

To hold the rollers in position, the storage unit of this invention further comprises structures 30 and 31 extending a flank the carriages. The heights of structures or lateral sides 30, 31 are shiftable by conventional means to enable the rollers to load/unload to/from all the carriage planes. One of the lateral sides 30 and 31 (in the drawing the structure or lateral side 31) is a drive structure and the other, 30, is a backing structure. Both lateral sides have a plurality of engagement assemblies 23 adapted to hold the rollers firmly in position. The assembly 23 will be provided, preferably, with a groove for receiving the tip 22 of a roller and will securely hold it by any suitable means. As an example, the assemblies 23 may be jointed, serrated, or fabricated from antifriction metal or rubber materials, or have any other suitable construction. The drive assembly 32 (not shown in detail because of a type known per se) has the function of rotating the rollers for transporting the tiles.

A further embodiment of the invention is shown in FIGS. 7 and 8, where parts similar to the preceding embodiment are designated with the same reference numerals and corresponding, though not identical, parts are designated with the same numerals with a prime ('). In this instance, the elastic means no longer is accommodated inside the rollers, but rather in at least one engagement assembly 23' for each roller, that is at at least one of the unit lateral sides or side members 30' and 31'. In this case, the roller need not be extended in order to fit it into the engagement assemblies after a roller has been inserted into the carriage and upon reaching the level of a desired plane. Accordingly, the roller carrier machine 2' of this embodiment does not include the second hydraulic system (24 in FIG. 3) but only the hydraulic piston or set of pistons 12, structures 13, and roller holder platform 8 for supporting the rollers 9' by means of the racks 11.

The lateral sides 30' and 31' are equipped with motor units 33 operative to translate them to and from the carriage, as shown by dashed lines in FIG. 8. The motor units 33 may be of any conventional type, e.g. hydraulically operated units. Of course, the roller is not required in this case to include an elastic means, and the engagement assemblies 23' will be provided at at least one lateral side (30' in FIG. 8) with a spring element 34 and pointed portion 35 adapted for insertion into a corresponding groove 36 of the roller, the element 35 being slidable within a housing enclosing the spring.

The unit according to this invention operates in a quite simple manner.

A carriage to be loaded (or unloaded) is first moved into position between the lateral sides 30 and 31.

With the first embodiment (FIGS. 3–6) of the invention, the roller carrier machine 2 is positioned under the carriage with the platform 8 in its lowermost position and the rollers 9 in their retracted or shortened condition, i.e. with the element 19 inserted into the cylinder 18 as far as the stop 21 against the biasing force of the spring 17. In that condition, the rollers may be shifted vertically without interfering with the carriage main frame.

Thereafter, by operating the hydraulic cylinders 12 the platform is raised to a desired level such that the rollers can be inserted exactly through the vertical passageways 7 between the carriage small frames. On reaching the level of the desired deck, the hydraulic piston system 24 is operated, to displace the racks 11 such that the roller is extended as far as allowed by the spring (or springs) 17. In this condition, the roller is sufficiently long to be held securely in the engagement assemblies 23 of the lateral sides 30 and 31. The rollers are then rotated by the motor 32 for the tile loading (or unloading) operation.

On completion of that operation, the roller is again retracted or shortened by means of the hydraulic system 24, the platform is lowered, and the loaded carriage is removed and replaced with another, empty, carriage to be loaded.

In the instance of the embodiment shown in FIGS. 7 and 8, the operation is similar excepting that instead of changing the length of the rollers to insert them into the engagement assemblies, the lateral sides 30' and 31' are moved to and from the carriage, in particular the assemblies 23' of said lateral sides. Thus, as the roller 9' reaches the desired level, the assemblies 23' are brought to flank the carriage such that the pointed elements 35 may be inserted through the vertical passageways 7 and held rigidly in the grooved portions 36 of the rollers. Conversely, to disengage the rollers, the assemblies 23' are moved away from the carriage, the rollers are lowered by the previous machine to a lower horizontal level with respect to the carriage bearing structure, as with the former embodiment, and the loaded (or unloaded) carriage is removed as desired.

While the invention has been described in connection with particular embodiments thereof, it is obvious that it is not limited thereby, but on the contrary, encompasses any variations thereof. Thus, as an example, the hydraulic systems may be different from those described herein. Instead of one hydraulic pump 12, a number, e.g. four, of such pumps may be used in serial connection according to conventional practice. The structures 13 which function to shift the rollers in a vertical direction could have a different configuration. The rollers could be provided with elastic means at just one end thereof.

It will be noted, moreover, that the field of application of this unit is not limited to its use in a tile manufacturing plant. On the contrary, this article buffer storage unit may be advantageously employed in any equivalent field where processing partly on a continuous cycle basis and partly on an intermittent basis is contemplated for plate-like blanks and articles.

I claim:

1. A buffer storage unit for storing substantially plate-like ceramic articles, said unit comprising:

at least one carriage movable along a feed-in line and adapted to accommodate a plurality of articles, said carriage including a plurality of small frames extending in vertical planes and mounted on a carrier structure formed from sectional members arranged to surround a parallelepipedon defined by said small frames, each said small frame including a pair of vertical uprights having attached thereto a plurality of horizontal bar elements, said bar elements of said plurality of small frames defining plural horizontal planes for supporting said articles, and said small frames defining therebetween vertical spaces;

a roller holder platform having a pair of spaced roller locating racks supporting opposite ends of a plurality of rollers, each said roller including an outer cylindrical element, an inner cylindrical element slidably extending into said outer cylindrical element, and spring means biasing said cylindrical elements apart;

means for moving said roller holder platform vertically, and thereby for moving said rollers vertically within respective said vertical spaces, to align said rollers with a selected horizontal plane to enable an operation of loading/unloading of said articles, said vertical moving means comprising at least one structure of pivotally connected members also connected to said roller holder platform, and first hydraulic cylinder means connected to at least one said member to relatively pivot said members and thereby to vertically move said roller holder platform;

engagement means, arranged to flank said carriage, for holding said rollers in position during said loading/unloading operation; and means for moving said rollers into and from said engagement means, said moving means comprising second hydraulic cylinder means, mounted on said roller holder platform and connected to said locating racks by respective couplings and guides, for moving said locating racks toward each other, thereby moving said inner cylindrical elements of said rollers toward each other against the force of said spring means, to reduce the length of said rollers when said rollers are to be released from said engagement means, and for moving said locating racks away from each other, thereby allowing said spring means to move said inner cylindrical elements of said rollers away from each other to increase the length of said rollers when said rollers are to be engaged by said engagement means.

2. A unit as claimed in claim 1, wherein opposite ends of said rollers are pointed, and said engagement means have recesses receiving said pointed ends.

3. A buffer storage unit for storing substantially plate-lie ceramic articles, said unit comprising:
- at least one carriage movable along a feed-in line and adapted to accommodate a plurality of articles, said carriage including a plurality of small frames extending in vertical planes and mounted on a carrier structure formed from sectional members arranged to surround a parallelepipedon defined by said small frames, each said small frame including a pair of vertical uprights having attached thereto a plurality of horizontal bar elements, said bar elements of said plurality of small frames defining plural horizontal planes for supporting said articles, and said small frames defining therebetween vertical spaces;
- a roller holder platform having a pair of spaced roller locating racks supporting opposite ends of a plurality of rollers;
- means for moving said roller holder platform vertically, and thereby for moving said rollers vertically within respective said vertical spaces, to align said rollers with a selected horizontal plane to enable an operation of loading/unloading of said articles, said vertical moving means comprising at least one structure of pivotally connected members also connected to said roller holder platform, and hydraulic cylinder means connected to at least one said member to relatively pivot said members and thereby to vertically move said roller holder platform;
- drive and backing side members on opposite lateral sides of said carriage;
- engagement means, mounted on said side members, for holding said rollers in position during said loading/unloading operation; and
- motor means for moving said engagement means of said side members toward and away from said carriage and thereby to engage with and disengage from, respectively, opposite ends of said rollers.

4. A unit as claimed in claim 3, wherein said engagement means have elements with pointed ends received in recesses in respective ends of said rollers, and further comprising spring means for biasing said pointed elements of at least one said engagement means toward the respective said roller ends.

* * * * *